United States Patent [19]
McMillan et al.

[11] Patent Number: 5,462,706
[45] Date of Patent: Oct. 31, 1995

[54] METHOD FOR FORMING A FLANGE ON AN END OF A SYNTHETIC LINER

[75] Inventors: James S. McMillan, Benbrook; Simon Tarsha, Fort Worth, both of Tex.

[73] Assignee: Pipe Rehab International, Inc., Memphis, Tenn.

[21] Appl. No.: 151,468

[22] Filed: Nov. 9, 1993

Related U.S. Application Data

[63] Continuation of Ser. No. 934,117, Aug. 21, 1992, abandoned.

[51] Int. Cl.⁶ ............................ B29C 57/00; B29C 63/34; B29C 65/02
[52] U.S. Cl. .................. 264/138; 156/294; 156/304.2; 156/309.6; 264/231; 264/248; 264/269; 264/270
[58] Field of Search ..................... 264/229, 138, 264/230, 248, 231, 249, 269, 270, 322; 156/294, 309.9, 309.4, 304.2, 304.5; 285/55, 416

[56] References Cited

U.S. PATENT DOCUMENTS

| | | | |
|---|---|---|---|
| 2,725,079 | 11/1955 | Stread et al. | 285/416 |
| 3,142,868 | 8/1964 | Blount | 432/225 |
| 3,228,096 | 1/1966 | Albro | 285/55 |
| 3,707,049 | 9/1975 | Baffas | 285/55 |
| 3,709,049 | 9/1975 | Blantica | 285/416 |
| 3,897,296 | 7/1975 | Waldrum | 156/309.9 |
| 3,968,552 | 7/1976 | Hunter | 285/55 |
| 4,018,863 | 4/1977 | Schneiders et al. | 264/249 |
| 4,290,456 | 9/1981 | Ahrbeck | 285/416 |
| 4,302,183 | 8/1981 | Pero | 432/225 |
| 4,457,886 | 7/1984 | Acda et al. | 264/249 |
| 4,525,319 | 6/1985 | Kaspe | 264/322 |
| 4,847,094 | 7/1989 | Parmann | 264/249 |
| 4,933,036 | 6/1990 | Shaposka et al. | 156/309.9 |
| 4,997,613 | 3/1991 | McMillan | 264/249 |
| 5,078,827 | 1/1992 | Calderwood | 156/304.2 |
| 5,094,795 | 3/1992 | McMillan et al. | 264/249 |
| 5,105,524 | 4/1992 | Darling | 264/249 |

OTHER PUBLICATIONS

*Installation and Fabrication Manual*, Dow Chemical Company, pp. 20–24, no date.
PCT Publication WO 89/0821 Sep. 8, 1989.

Primary Examiner—Jay H. Woo
Assistant Examiner—Duane S. Smith
Attorney, Agent, or Firm—Charles D. Gunter, Jr.

[57] ABSTRACT

A method is shown for forming a flange on an end of a plastic pipe liner of the type used to line a tubular member. A preformed synthetic disc is installed on the end of the synthetic liner which extends from the tubular member. The exposed end of synthetic liner is surrounded with a forming unit which includes a heating unit and an associated forming mandrel. The heating unit is extended to heat the junction between the preformed disc and exposed end of the liner to form a weld area between the two. The forming mandrel is then extended to compress the molten weld area between the liner and disc. The remaining exposed material is removed to form a finished surface coplanar with the face of the synthetic disc.

13 Claims, 3 Drawing Sheets

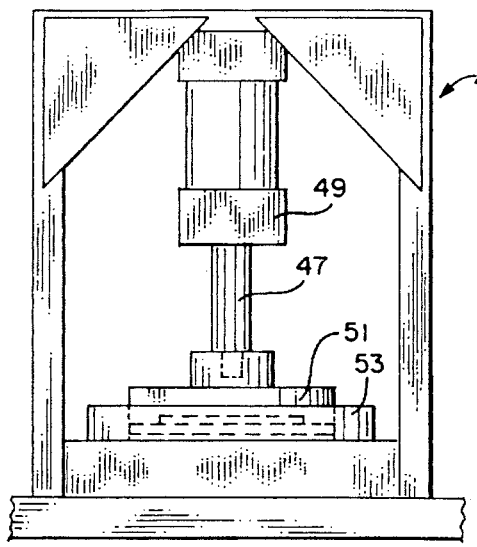
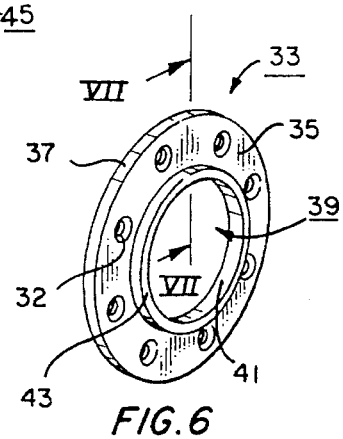
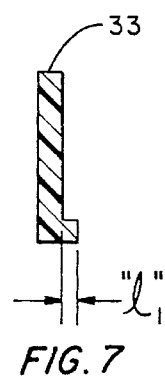
FIG. 5  FIG. 6  FIG. 7
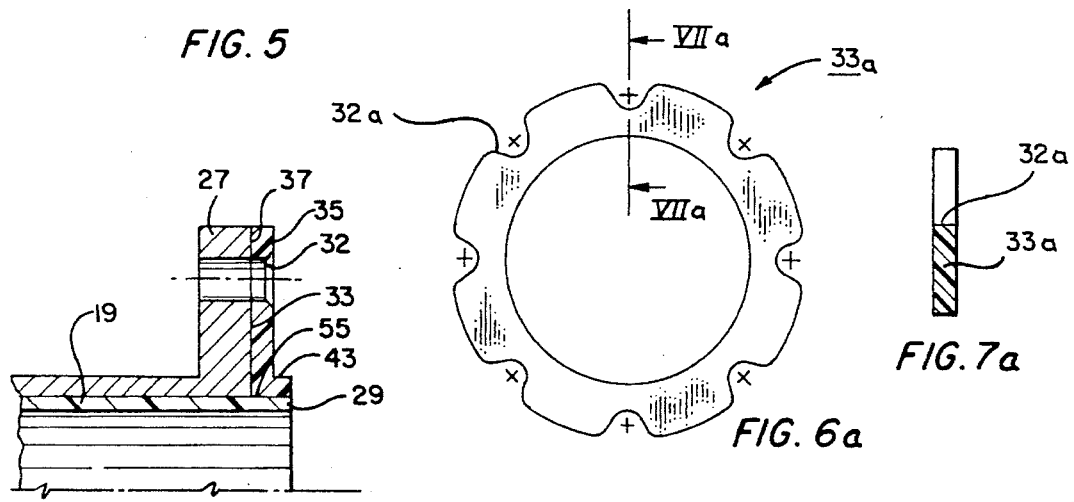
FIG. 8  FIG. 6a  FIG. 7a
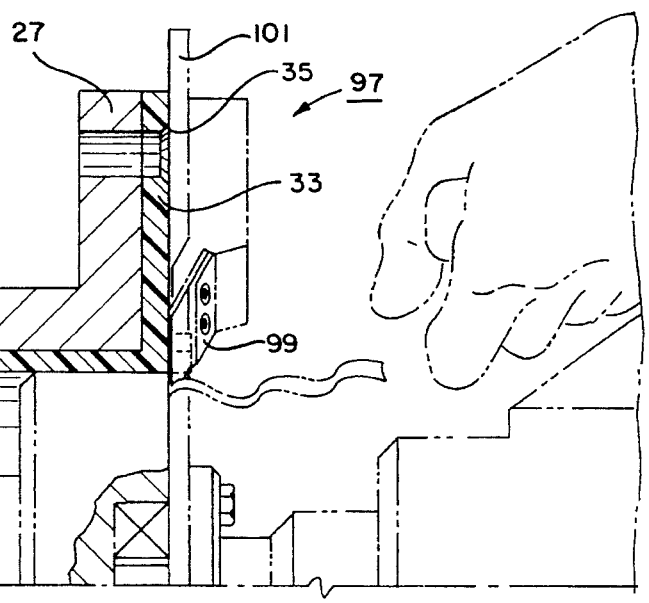
FIG. 13

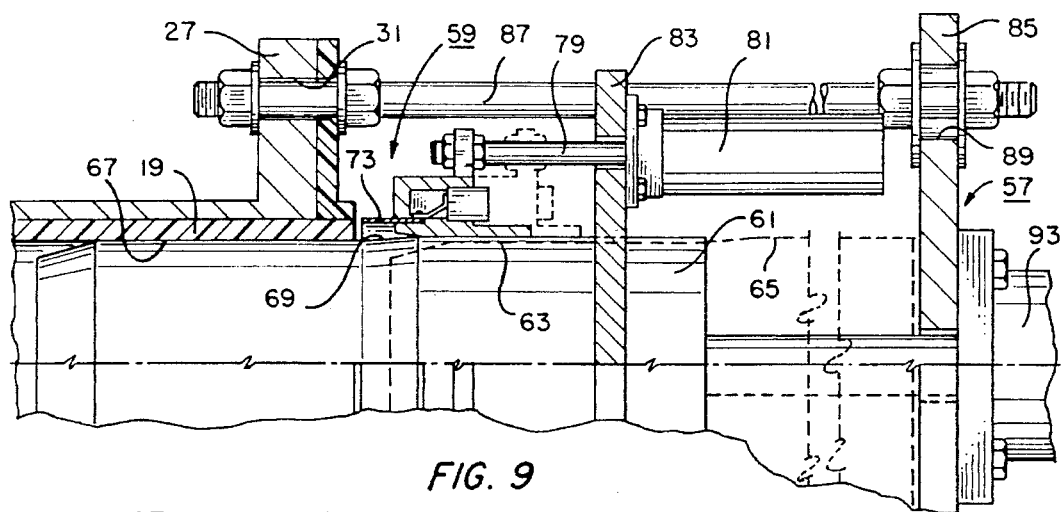
FIG. 9
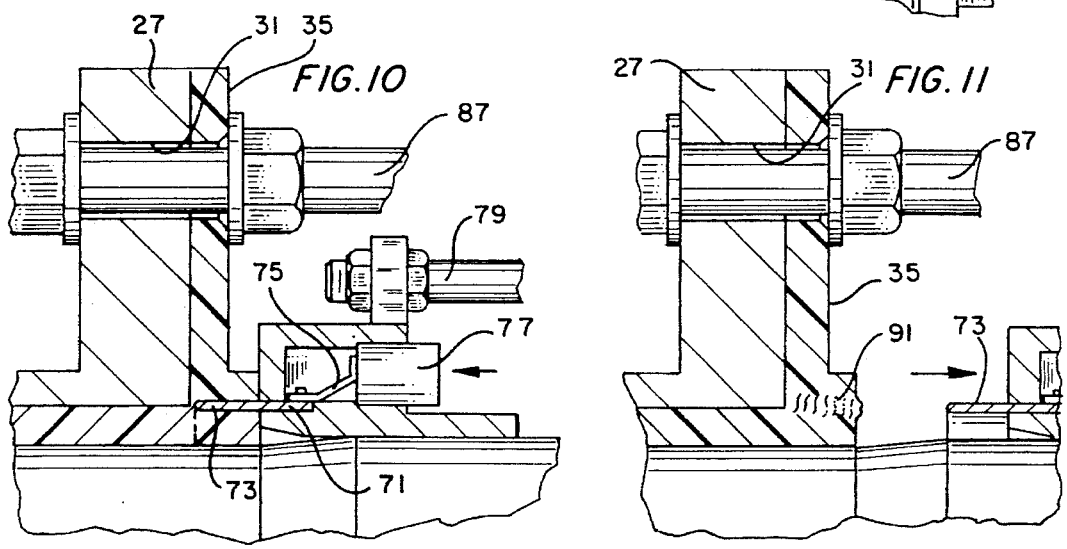
FIG. 10
FIG. 11
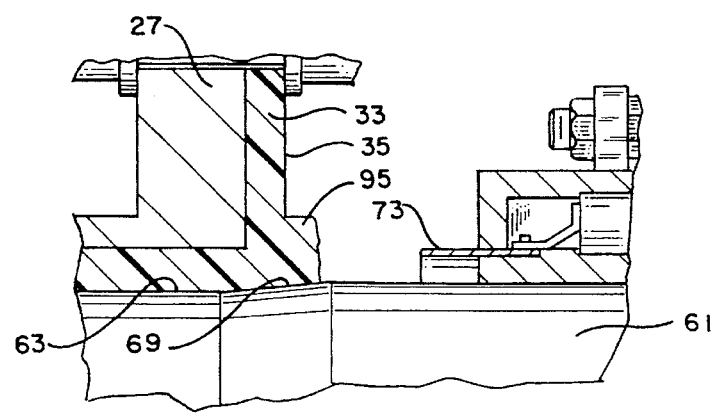
FIG. 12

METHOD FOR FORMING A FLANGE ON AN END OF A SYNTHETIC LINER

This is a continuation of application Ser. No. 07/934,117 filed on Aug. 21, 1992 (now abandoned).

BACKGROUND OF THE INVENTION

1. Field of the Invention

This invention relates to a method and device for installing a flange on the end of a plastic pipe and to an improved tubular member lined with a plastic pipe liner having such a flanged end.

2. Description of the Prior Art

The installation of plastic pipe liners within tubular members provides several advantages. For example, such liners are used to repair pipelines which have developed cracks or leak points through which conveyed fluid is lost. Such liners are also used to protect metal pipelines from internal corrosion resulting from the corrosive nature of the conveyed fluid.

The plastic pipe liners which have been installed within metal tubular members are usually thermoplastic materials. These materials can be heated to a temperature and for a time sufficient to render the material to a malleable state and to allow components thereof to be fused together. The term "plastic" is intended to include, for example, polyethylene, polyvinylchloride, polyvinylchloride acetate, polystyrene, and the like. Traditionally, the weakest part of the lined pipe system has been the flanged end portions. Various adapters have been provided in the past for joining sections of the pipeline as well as the associated sections of plastic liners. In one prior art technique, adapters were fused onto the plastic liner ends which protruded from the section of metallic pipeline while the liner was in a downsized state. Since the adapters were of a fixed length, it was necessary to accurately calculate the expansion and contraction characteristics of the plastic liner installed within the section of metallic pipeline to prevent the adapter from being pulled out of position upon contraction of the liner as the liner returned to its relaxed state.

In other prior art techniques, an exposed portion of the plastic liner was bent backward at an angle or "flared" to form a flange on the plastic liner. U.S. Pat. No. 3,142,868, to Blount, issued Aug. 4, 1964, is typical of this type prior art approach in which a mechanical device is utilized to flare a liner end extending from a metallic, tubular member. The process also involved heating, supporting and cooling the flared end.

The prior art techniques all suffer from the shortcoming that the liner flanged end could be drawn longitudinally inward into the interior of the tubular member upon contraction of the liner material. Flaring also created thin wall regions at the flanged end which were subject to shearing and failure.

The present invention has as its object to provide a method and device for forming a flange on an end of a plastic pipe liner which resists the tendency to contract, once installed, and be pulled into the interior of the surrounding tubular member.

Another object of the invention is to provide a simple and economical method for forming such a flange on a plastic pipe liner used to line a tubular member.

SUMMARY OF THE INVENTION

The method of the invention is used for forming a flange on an end of a synthetic liner of the type used to line a tubular member having opposed flanged ends. The synthetic liner has opposing ends, at least one of which extends outwardly to be exposed from one of the opposing ends of the tubular member. A synthetic disc is preformed from a synthetic elastomer which is compatible with the synthetic liner. The synthetic disc has an outer lateral face, an outer peripheral lip and a central bore which defines an internal lip.

The preformed disc is installed about the exterior of the exposed end of the synthetic liner and is moved into position flush with the flanged end of the tubular member so that the internal lip of the synthetic disc is seated on the exterior surface of the synthetic liner.

The exposed end of the synthetic liner is then surrounded with a forming unit having an axially extendible heating unit and an associated, axially extendible forming mandrel. The forming mandrel has an outer extent with a first external diameter which is received within the interior of the synthetic liner and also has an inner extent with a second, relatively greater external diameter. The heating unit is axially extended to heat the internal lip of the synthetic disc while simultaneously heating the exterior of the exposed end of the synthetic liner for a time and to a temperature sufficient to render the materials thereof to a malleable state and form a molten weld area. The heating unit is then axially retracted and the forming mandrel is axially extended, whereby the inner extent is received within the interior of the synthetic liner to compress the molten weld area between the liner and disc. The forming mandrel is then axially retracted and any remaining exposed material is removed to form a finished surface coplanar with the remaining lateral face of the synthetic disc.

Preferably, the synthetic liner is rolled to a reduced external diameter prior to insertion within the tubular member and is allowed to expand to its original outside diameter to secure the liner within the tubular member prior to forming the flange.

The heat is preferably provided to the heating unit by means of an electric resistance heating element in the form of a metallic cylinder having an outer blade-like portion. The blade-like portion is inserted between the surface formed by the internal lip of the synthetic disc and the surface formed by the exterior of the exposed end of the synthetic liner in order to form the molten weld area between the liner and disc.

The forming mandrel inner and outer extents are preferably connected by a chamfered region formed between the region of relatively greater external diameter on the inner extent of the mandrel and the region of relatively lesser external diameter on the outer extent thereof, the chamfered region serving to compress and taper the interior of the synthetic liner after forming the weld area between the liner and disc.

In a preferred embodiment of the invention, the exposed end of the synthetic liner is surrounded by a forming unit which includes a frame carrying the axially extendible heating unit and the associated, axially extendible forming mandrel. The frame is mounted to the flanged end of the tubular member and carries a first hydraulic cylinder for actuating the heating unit and a second hydraulic cylinder for actuating the forming mandrel.

Additional objects, features and advantages will be apparent in the written description which follows.

BRIEF DESCRIPTION OF THE DRAWINGS

FIG. 5 is a simplified view of a press up the type used to form the synthetic disc used in forming the flange of the invention;

FIG. 6 is a front, perspective view of the synthetic disc which is installed on the synthetic liner to form the flanged end;

FIG. 6a is a front, perspective view of another version of the synthetic disc which is installed on the synthetic liner to form the flanged end;

FIG. 7 is a side, cross-sectional view taken along lines VII—VII in FIG. 6;

FIG. 7a is a side, cross-sectional view taken along lines VIIa—VIIa in FIG. 6a;

FIG. 8 is a partial, cross-sectional view of the tubular member, synthetic liner and synthetic disc prior to the installation of the forming unit used during the method of the invention;

FIG. 9 is a partial, cross-sectional view of the tubular member showing the forming unit in place and showing the heating unit and forming mandrel used during the method of the invention;

FIG. 10 is a partial, cross-sectional view similar to FIG. 9 showing the heating unit being extended during one step of the method of the invention;

FIG. 11 is a view similar to FIG. 10 showing the retraction of the heating unit after forming a weld area;

FIG. 12 is a partial, cross-sectional view of the tubular member and forming unit showing the extension of the forming mandrel used during one step of the method of the invention; and FIG. 13 is a partial, cross-sectional view of the synthetic liner and tubular member with the flange installed, showing the cutting operation which is used to remove remaining material and form a finished surface on the flange of the invention.

DETAILED DESCRIPTION OF THE INVENTION

Figure 1:
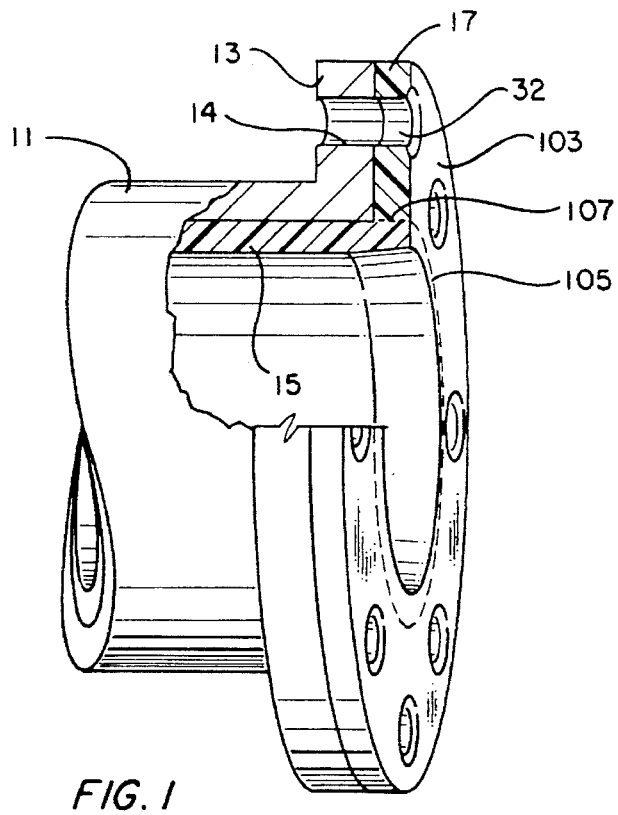
FIG. 1 is a partial, perspective view of the flanged end of a metal pipeline having the flanged plastic pipe liner of the invention installed thereon, the view being partly broken away for ease of illustration.

FIG. 1 shows a tubular member, in this case steel pipe 11, having a flanged end 13 and including a synthetic liner 15 having a flange 17 formed thereon according to the method of the present invention. The tubular member 11 can serve any of a number of purposes. For example, the tubular member 11 could be a metallic pipeline of the type used in the oil and gas industries, a fluid conduit for conveying chemicals or corrosive liquids, or a water or natural gas conduit. In any case, the flanged end 13 extends generally perpendicular to the longitudinal axis of the tubular member and is usually provided with bolt holes 14 for forming a connection with the next successive joint of pipe.

Figure 2:
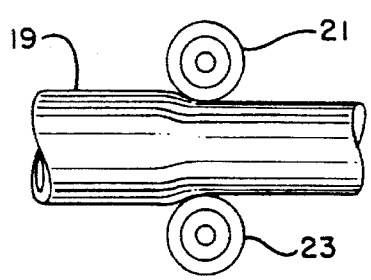
FIG. 2 is a schematic view of the rolling process used to reduce the external diameter of the synthetic liner used to line the tubular member.

In order to form the flange 17, a plastic pipe liner (19 in FIG. 2) is first installed within the surrounding metal pipeline. This can be accomplished in a number of ways, including stretching and inserting the liner, chemically bonding the liner, etc. FIG. 2 shows a plastic pipe liner 19 which is being downsized by passing through downsizing rollers 21, 23. Prior to recovering its original dimensions, the liner 19 is installed within a section of the metallic pipeline. The material of the liner 19 is preferably one of the conventionally known thermoplastic type materials, such as polyethylene.

Figure 3:
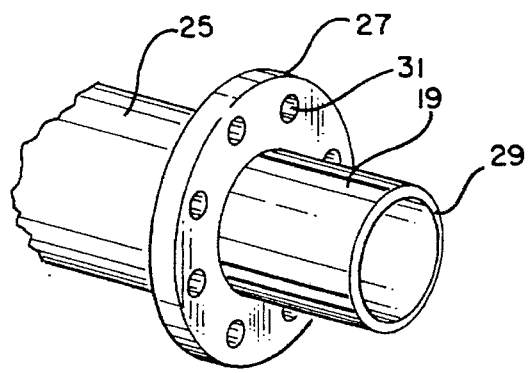
FIG. 3 is a partial, perspective view of the tubular member, in this case a metal pipeline, showing the synthetic liner opposed end which extends outwardly to be exposed from the end of the tubular member.

FIG. 3 shows the liner 19 installed within a tubular member 25 which, in this case, is a metallic pipeline having a flanged end 27 which is typically joined to the tubular member 25 at a weld line (not shown). At least one of the opposite ends 29 of the plastic pipe liner is extending outwardly to be exposed from the flanged end 27. Preferably, both ends are exposed. The flanged end 27 of the tubular member 25 has a plurality of circumferentially spaced, bolt-engaging holes 31.

Figure 4:
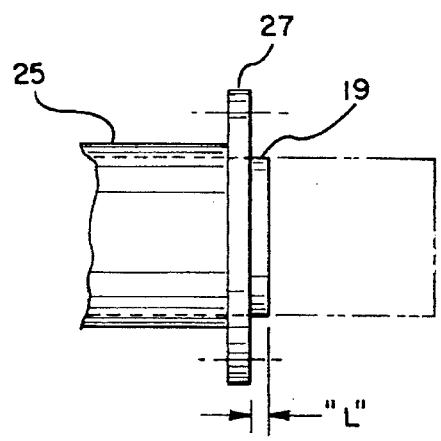
FIG. 4 is a schematic illustration of one step in the method of the invention in which the excess length of synthetic liner extending from the tubular member is cut prior to installation of the synthetic flange.

In order to install the flange on the synthetic liner, the exposed end 29 of the plastic pipe liner 19 is first trimmed, leaving a predetermined length ("l" in FIG. 4) for receiving a preformed, synthetic disc. The synthetic disc (33 in FIG. 6) is preformed from a synthetic elastomer which is compatible with the synthetic liner 19, for instance from polyethylene. The synthetic disc 33 has an outer lateral face 35 an outer peripheral lip 37 and a central bore 39 which defines an internal lip 41. In the embodiment of FIG. 6, the synthetic disc 33 also has an axially extending collar 43 which circumscribes the central bore 39. As shown in FIGS. 7 and 8, the axial length "$l_1$" of the collar 43 is approximately that length needed to mate flush with the trimmed, exposed end 29 of the plastic pipe liner 19. The disc of FIG. 6 also has a plurality of peripherally spaced holes 32 adapted to be aligned with bolt holes 14 (FIG. 1) in the pipe flanged end 13.

As shown in FIG. 6a, the disc 33a can also be provided without the axially extending collar 43. Also, as will be understood from FIG. 6a, a series of peripheral slots 32a can be utilized instead of the holes 32. In other respects, the operation of the invention is the same.

The synthetic disc 33 can be formed, for example, in a press such as hydraulic press 45 (FIG. 5) in which the output shaft 47 from the cylinder 49 operates to compress the die member 51 into a mating cavity or chamber 53 containing the material to be formed. Although the disc 33 is shown to be of a homogeneous, synthetic plastic, such as polyethylene, it will be understood that the ring can be reinforced, as well. A metallic reinforcement in the form of either a continuous metal ring or segments of metal could be embedded in or encapsulated within the disc 33.

The installation process will now be described with respect to the disc of FIG. 6. As shown in FIG. 8, the preformed disc 33 is first installed about the exterior 55 of the exposed end 29 of the synthetic liner and moved into position flush with the flanged end 27 of the tubular member 25 so that the collar 43 faces oppositely to the flanged end 27 of the tubular member. The internal lip 41 of the disc 33 is seated on the exterior surface of the synthetic liner.

As shown in FIG. 9, the exposed end of the liner 19 is then surrounded with a forming unit 57 having an axially extendible heating unit 59 and having an associated, axially extendible forming mandrel 61. The forming mandrel 61 has an outer extent 63 (shown in dotted lines in the retracted position in FIG. 9) and an inner extent 65. The outer extent has a first external diameter which is received within and closely mates with the interior 67 of the liner 19 when the mandrel is moved to the extended position shown in solid lines in FIG. 9. The mandrel inner extent 65 is of a greater relative external diameter and is connected by a chamfered region 69.

The heating unit 59 can assume various forms. It must be capable of heating the liner exposed end and collar region of the synthetic disc for a time and to a temperature sufficient to render the elastomeric materials thereof to a malleable state in order to form a molten weld area. In the case of thermoplastic pipes, such as those made from polyethylene, it is desirable to heat the contacted regions of material above about 257° F. to render the plastic material "malleable." In the preferred embodiment shown, heat is provided to the heating unit by means of an electric resistance heating element in the form of a metal cylinder 71 having an outer, blade-like portion 73. The blade-like portion 73 is connected by means of contacts 75 to an electrical source 77. Current supplied to the electrical source 77 passes through the contacts 75 to the resistance heating elements making up the blade-like portion 73, thereby allowing the unit to heat the internal lip and collar of the synthetic disc while simultaneously heating the exterior of the exposed end of the synthetic liner when the heating unit is axially extended to the position shown in FIG. 10.

The heating unit is extended by means of the output shaft 79 of a first hydraulic cylinder 81 which is mounted to the forward plate 83 of the forming unit 57. The forming unit 57 is retained on the end of the tubular member by means of positioning rods 87 which extend between the bolt holes 31 of the flanged end 27 and the bolt holes 89 of the rear plate 83 of the forming unit. The forming unit centers on the internal diameter of the tubular member 25 as the forming mandrel outer extent 63 moves from the retracted position shown in dotted lines in FIG. 9, to the position shown in solid lines. Note that bolt holes 89 on the rear plate 85 provide a "gap" with respect to rods 87, allowing some radial movement for centering the unit on the pipe I.D.

Actuation of the first hydraulic cylinder 81 causes the heating unit 59 to move in reciprocating fashion between the extended and retracted positions shown in FIGS. 10 and 11. Extension of the heating unit and actuation of the electrical source 77 causes a weld area to be formed between the respective regions of contact of the disc and synthetic liner.

After axially retracting the heating unit to the position shown in FIG. 11, the forming mandrel 61 is axially extended a second time from the centered position shown in solid lines in FIG. 9 to the forming position shown in FIG. 12. As the forming mandrel is axially extended, the inner extent 63 thereof passes further within the interior of the synthetic liner 67, causing the chamfered region 69 to compress the molten weld area (91 in FIG. 11), as shown in FIG. 12. The forming mandrel 61 is extended and retracted by means of a second hydraulic cylinder 93 (FIG. 9) which is mounted on the rear plate 85 of the forming unit 57. The second cylinder 93 includes an output shaft (not shown) connected to the forming mandrel for moving the mandrel between the retracted and fully extended positions.

After axially retracting the forming mandrel 61 to the position shown in dotted lines in FIG. 9, the remaining collar material (95 in FIG. 12) is removed to form a finished surface coplanar with the remaining lateral face 35 of the synthetic disc 33. The remaining collar material can be removed in a number of ways but is preferably trimmed by means of a cutting unit 97 (FIG. 13) having at least one cutting blade 99 mounted on floating arms 101 which ride on the outer lateral face 35 of the disc 33 to ensure that the collar material is cut flush with the outer lateral face.

The process for installing the disc 33a of FIG. 6a is identical to that previously described. Even though disc 33a lacks a "collar", it is preferred to trim away any excess exposed material from the weld operation in the manner previously described in order to provide a smooth outer lateral face.

As shown in FIG. 1, the completed flange 17 has an outer lateral face 103 which is coplanar with what was initially the exposed end 105 of the synthetic liner. Although the weld area 107 is illustrated in dotted lines for clarity in FIG. 1, it will be understood that the material is essentially homogeneous along the weld line at the conclusion of the installation operation.

An invention has been provided with several advantages. The method for forming a flange of the invention overcomes many of the weaknesses associated with prior art lined pipe systems utilizing flanged seals. The flange seals of the invention do not loosen with temperature cycles as did the prior art flared or fused seals and do not tend to creep away from the flange faces and gaskets. The flanges of the invention are formed without relying upon contraction of the installed liner in order to seat the flange flush against the flanged end of the pipe. As a result, the flanges of the invention do not tend to creep or be dislocated with time.

While the invention has been shown in only one of its forms, it is not thus limited but is susceptible to various changes and modifications without departing from the spirit thereof.

What is claimed is:

1. A method for forming a flange on an end of a synthetic plastic liner of the type used to line a tubular member having opposed flanged ends, the synthetic liner having an exterior surface and opposing ends at least one of which extends outwardly to be exposed from one of the opposing ends of the tubular member, the method comprising the steps of:

supplying a synthetic disc formed from a synthetic elastomer which is compatible with the synthetic liner, the synthetic disc having an outer lateral face, an outer peripheral lip and a central bore which defines an internal lip;

installing the synthetic disc about the exterior surface of the exposed end of the synthetic liner and moving the disc into position flush with the flanged end of the tubular member, whereby the internal lip of the synthetic disc is seated on the exterior surface of the synthetic liner; and fusing the synthetic disc to the exterior of the synthetic liner by heating the areas adjacent the internal lip of the disc and the exterior surface of the exposed end of the synthetic liner to form a molten weld area therebetween.

2. A method for forming a flange on an end of a synthetic plastic liner of the type used to line a tubular member having opposed flanged ends, the synthetic liner having an exterior surface and opposing ends at least one of which extends outwardly to be exposed from one of the opposing ends of the tubular member, the method comprising the steps of:

supplying a synthetic disc formed from a synthetic elastomer which is compatible with the synthetic liner, the synthetic disc having an outer lateral face, an outer peripheral lip and a central bore which defines an internal lip;

installing the synthetic disc about the exterior surface of the exposed end of the synthetic liner and moving the disc into position flush with the flanged end of the tubular member, whereby the internal lip of the synthetic disc is seated on the exterior surface of the synthetic liner; and surrounding the exposed end of the synthetic liner with a forming unit having an axially extendible heating unit and having an associated, axially extendible forming mandrel, the forming mandrel having an outer extent with a first external diameter which is received within the interior of the synthetic liner and having an inner extent with a second, relatively greater external diameter;

fusing the synthetic disc to the exterior of the synthetic liner by axially extending the heating unit to heat the internal lip of the synthetic disc while simultaneously heating the exterior surface of the exposed end of the synthetic liner to thereby render the materials thereof to a malleable state and form a molten weld area;

axially retracting the heating unit;

axially extending the forming mandrel whereby the inner extent is received within the interior of the synthetic liner, thereby compressing the molten weld area between the liner and disc; and axially retracting the forming mandrel.

3. The method of claim 2, wherein the synthetic liner is rolled to a reduced diameter prior to insertion within the tubular member, the liner being allowed to expand to its original outside diameter to thereby secure the liner within the tubular member.

4. The method of claim 2, wherein heat is provided to the heating unit by means of an electric resistance heating element in the form of a metallic cylinder having an outer cylindrical portion.

5. The method of claim 2, wherein the outer cylindrical portion of the metallic cylinder is inserted between the surface formed by the internal lip of the synthetic disc and the surface formed by the exterior of the exposed end of the synthetic liner in order to form the molten weld area between the liner and disc.

6. The method of claim 5, wherein forming mandrel inner and outer extents are connected by a chamfered region formed between a region of relatively greater external diameter on the inner extent and a region of relatively lesser external diameter on the outer extent, the chamfered region serving to compress and taper the interior of the synthetic liner after forming the weld area between the liner and disc.

7. A method for forming a flange on an end of a synthetic plastic liner of the type used to line a tubular member having opposed flanged ends, the flanged ends having a plurality of circumferentially spaced, bolt-engaging holes, the synthetic liner having an exterior surface and opposing ends at least one of which extends outwardly to be exposed from one of the opposing ends of the tubular member, the method comprising the steps of:

supplying a synthetic disc formed from a synthetic elastomer which is compatible with the synthetic liner, the synthetic disc having an outer lateral face, an outer peripheral lip and a central bore which defines an internal lip, the synthetic disc also having an axially extending collar which circumscribes the central bore, the synthetic disc also having a plurality of circumferentially spaced, bolt-engaging holes which are arranged to mate with the holes provided in the flanged ends of the tubular member;

installing the synthetic disc about the exterior surface of the exposed end of the synthetic liner and moving the disc into position flush with the flanked end of the tubular member so that the collar faces oppositely to the flanged end of the tubular member, whereby the internal lip of the synthetic disc is seated on the exterior surface of the synthetic liner; and surrounding the exposed end of the synthetic liner with a forming unit including a frame having an axially extendible heating unit and having an associated, axially extendible forming mandrel, the frame being mounted to the bolt holes provided on the flanged end of the tubular member, the frame carrying a first hydraulic cylinder for actuating the heating unit and a second hydraulic cylinder for actuating the forming mandrel, the forming mandrel having an outer extent with a first external diameter which is received within the interior of the synthetic liner and having an inner extent with a second, relatively greater external diameter;

fusing the synthetic disc to the exterior of the synthetic liner by axially extending the heating unit to heat the internal lip and collar of the synthetic disc while simultaneously heating the exterior surface of the exposed end of the synthetic liner to thereby render the materials thereof to a malleable state and form a molten weld area;

axially retracting the heating unit;

axially extending the forming mandrel whereby the inner extent is received within the interior of the synthetic liner, thereby compressing the molten weld area between the liner and disc;

axially retracting the forming mandrel; and cutting the remaining collar with a blade to form a finished surface coplanar with the remaining lateral face of the synthetic disc.

8. The method of claim 7, wherein the synthetic liner is rolled to a reduced diameter prior to insertion within the tubular member, the liner being allowed to expand to its original outside diameter to thereby secure the liner within the tubular member.

9. The method of claim 8, wherein heat is provided to the heating unit by means of an electric resistance heating element in the form of a metallic cylinder having an outer cylindrical portion.

10. The method of claim 9, wherein the outer cylindrical portion of the metallic cylinder is inserted between the surface formed by the internal lip end collar of the synthetic disc and the surface formed by the exterior of the exposed end of the synthetic liner in order to form the molten weld area between the liner and disc.

11. The method of claim 10, wherein forming mandrel inner and outer extents are connected by a chamfered region formed between a region of relatively greater external diameter on the inner extent and a region of relatively lesser external diameter on the outer extent, the chamfered region serving to compress and taper the interior of the synthetic liner after forming the weld area between the liner and disc.

12. The method of claim 11, wherein the synthetic liner is of polyethylene.

13. The method of claim 12, wherein the synthetic disc is provided with a metallic reinforcement.

\* \* \* \* \*